US012686488B2

(12) United States Patent
Möbius et al.

(10) Patent No.: US 12,686,488 B2
(45) Date of Patent: Jul. 21, 2026

(54) INTEGRATED FLAP CONTROL UNIT

(71) Applicant: Archer Aviation Inc., San Jose, CA (US)

(72) Inventors: Andreas Möbius, Munich (DE); Sebastien Vermeiren, Munich (DE); Daniel Wiegand, Wessling (DE); Javier Sainz De La Maza, Wessling (DE); Andreas Niedermeyer, Wessling (DE); Pasqualino Donnini, Wessling (DE); Pedro Miranda, Wessling (DE)

(73) Assignee: Archer Aviation Inc., San Jose, CA (US)

( * ) Notice: Subject to any disclaimer, the term of this patent is extended or adjusted under 35 U.S.C. 154(b) by 84 days.

(21) Appl. No.: 17/673,342

(22) Filed: Feb. 16, 2022

(65) Prior Publication Data

US 2022/0266987 A1     Aug. 25, 2022

(30) Foreign Application Priority Data

Feb. 19, 2021     (EP) ...................................... 21158176
Feb. 3, 2022     (WO) ................. PCT/EP2022/052571

(51) Int. Cl.
*H02P 6/17*          (2016.01)
*B64C 9/38*          (2006.01)
(Continued)

(52) U.S. Cl.
CPC .............. *B64C 9/38* (2013.01); *B64C 13/503* (2013.01); *B64C 29/0075* (2013.01);
(Continued)

(58) Field of Classification Search
CPC ...................................................... B60L 50/51
See application file for complete search history.

(56) References Cited

U.S. PATENT DOCUMENTS 2,964,264 A     12/1960   Hans
3,179,354 A      4/1965   Alvarez-Calderon
(Continued)

FOREIGN PATENT DOCUMENTS

CN        104300770 A      1/2015
CN        108688803 A     10/2018
(Continued)

OTHER PUBLICATIONS

International Search Report and Written Opinion issued for Application No. PCT/EP2022/052571, dated Jun. 23, 2022.
(Continued)

*Primary Examiner* — Kawing Chan
*Assistant Examiner* — Charles S Laughlin
(74) *Attorney, Agent, or Firm* — Finnegan, Henderson, Farbow, Garrett & Dunner, LLP

(57)          ABSTRACT

Disclosed is an integrated controller unit controlling at least one engine motor and at least one servo motor, comprising a power link section connecting the controller unit to an external power supply and supplying power to individual sections of the controller unit, a data link section connecting the controller unit to an external data source, a computing section connected with the power link section and the data link section for receiving data from the external data source, performing computing tasks based on the received data and outputting control commands, an engine interface section driving the at least one engine motor, and a servo interface section driving the at least one servo motor. The engine interface section and the servo interface section are both connected to the computing section and adapted to drive the at least one engine motor and the at least one servo motor based on the control commands.

15 Claims, 2 Drawing Sheets

Figure 1:
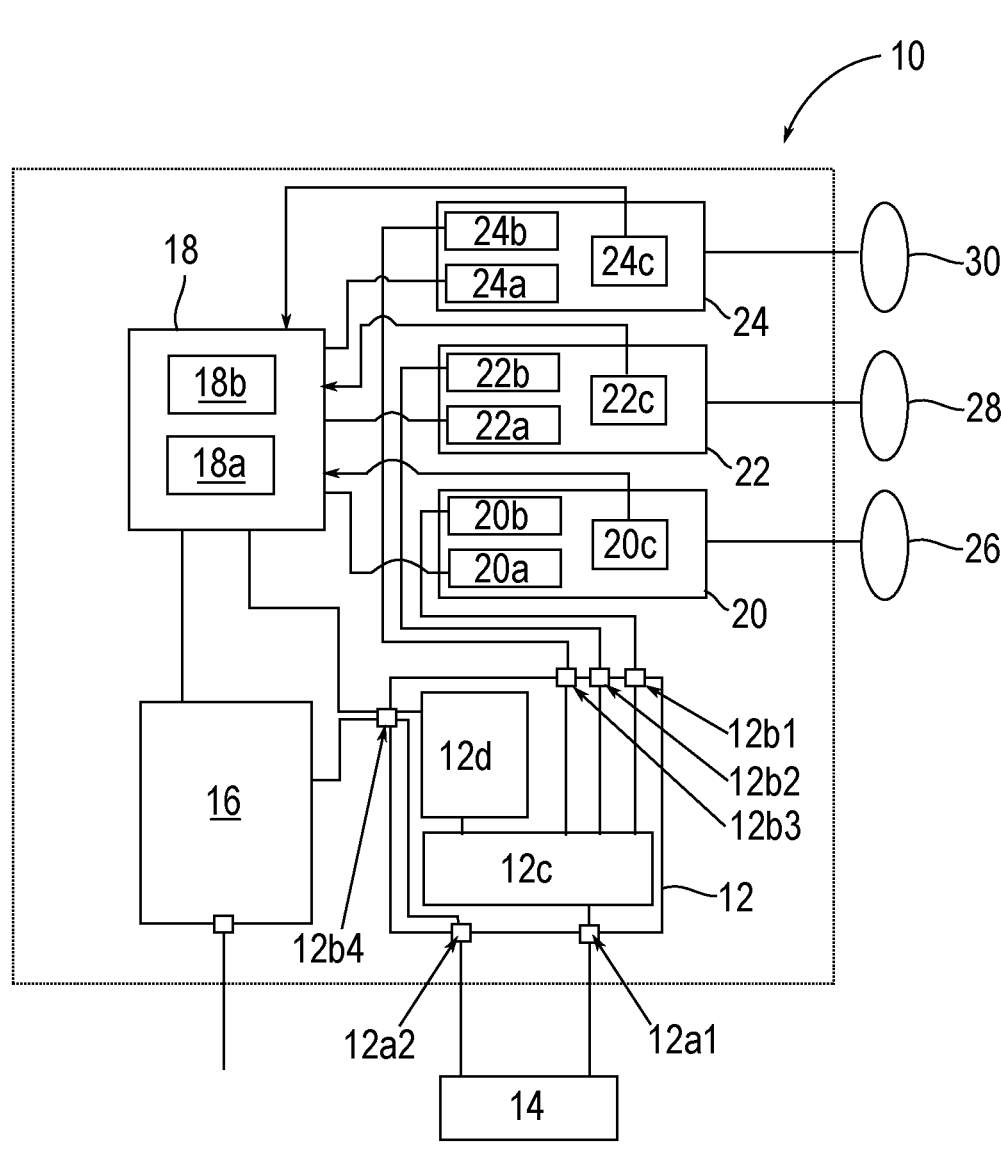

(51) Int. Cl.

| | |
|---|---|
| *B64C 13/50* | (2006.01) |
| *B64C 29/00* | (2006.01) |
| *B64D 15/16* | (2006.01) |
| *B64D 27/32* | (2024.01) |
| *B64D 27/34* | (2024.01) |
| *B64D 31/16* | (2024.01) |
| *H02M 1/44* | (2007.01) |
| *H02M 3/156* | (2006.01) |
| *H02P 7/18* | (2006.01) |
| *H02P 8/08* | (2006.01) |
| *H02P 101/30* | (2015.01) |

(52) U.S. Cl.

CPC .......... *B64D 15/163* (2013.01); *B64D 27/32* (2024.01); *B64D 27/34* (2024.01); *B64D 31/16* (2024.01); *H02M 1/44* (2013.01); *H02M 3/156* (2013.01); *H02P 8/08* (2013.01); *B64D 2221/00* (2013.01); *H02P 2101/30* (2015.01)

(56) References Cited

U.S. PATENT DOCUMENTS

| | | | |
|---|---|---|---|
| 5,001,704 A | 3/1991 | Narup | |
| 5,244,167 A | 9/1993 | Turk et al. | |
| 6,133,846 A | 10/2000 | Birkedahl | |
| 10,737,797 B2 | 8/2020 | Murrow et al. | |
| 10,787,254 B1 | 9/2020 | Chen | |
| 11,597,509 B1 | 3/2023 | Alfaro | |
| 2007/0246610 A1* | 10/2007 | Rath .................... | G05D 1/0022 244/189 |
| 2009/0069956 A1 | 3/2009 | Taya | |
| 2013/0013116 A1 | 1/2013 | Mancuso | |
| 2013/0094353 A1 | 4/2013 | Monroe | |
| 2015/0021983 A1* | 1/2015 | Karimi ................ | H02M 1/0043 307/31 |
| 2015/0029902 A1 | 1/2015 | Tischler et al. | |
| 2016/0311522 A1 | 10/2016 | Wiegand | |
| 2017/0043862 A1 | 2/2017 | Lippincott | |
| 2017/0203839 A1 | 7/2017 | Giannini | |
| 2017/0343357 A1 | 11/2017 | Mere | |
| 2017/0355449 A1 | 12/2017 | Bapat et al. | |
| 2018/0022444 A1 | 1/2018 | Nakagawa | |
| 2018/0113836 A1 | 4/2018 | Hirata | |
| 2018/0362146 A1 | 12/2018 | Klein | |
| 2019/0217937 A1 | 7/2019 | Wiegand | |
| 2019/0334741 A1 | 10/2019 | Dormiani et al. | |
| 2020/0017233 A1* | 1/2020 | Saint Requier .... | G05B 23/0272 |
| 2020/0031454 A1 | 1/2020 | Wilkens | |
| 2020/0125858 A1 | 4/2020 | Bauer | |
| 2020/0164995 A1 | 5/2020 | Lovering et al. | |
| 2020/0301446 A1* | 9/2020 | Leong ..................... | B64C 15/12 |
| 2020/0346747 A1* | 11/2020 | Lukaczyk .............. | B64U 50/19 |
| 2020/0346769 A1 | 11/2020 | Knapp et al. | |
| 2020/0391862 A1 | 12/2020 | Groninga et al. | |
| 2022/0281594 A1 | 9/2022 | Ochoa De Eribe Martínez et al. | |

FOREIGN PATENT DOCUMENTS

| | | |
|---|---|---|
| CN | 110254706 A | 9/2019 |
| CN | 111 268 120 A | 6/2020 |
| CN | 111605708 | 9/2020 |
| DE | 10 2015 207 445 A1 | 10/2016 |
| EP | 3 254 960 A1 | 12/2017 |
| GB | 720 394 A | 12/1954 |
| WO | 2017/200610 A1 | 11/2017 |
| WO | 2019006469 A1 | 1/2019 |
| WO | 2020188604 A2 | 9/2020 |

OTHER PUBLICATIONS

International Search Report and Written Opinion issued for Application No. PCT/EP2022/052644 dated Jun. 20, 2022.

International Search Report and Written Opinion issued for Application No. PCT/EP2022/052300, dated May 12, 2022.

European Search Report for EP 21 158 264.8. Mailed Nov. 10, 2021. 29 pages.

European Search Report for EP 21 161 129.8 mailed Aug. 5, 2021. 26 pages.

Anonymous "An introduction to the Lilium Jet". Internet Citation, May 19, 2019 (May 19, 2019), XP002803786.

Office Action issued for U.S. Appl. No. 17/673,489, dated Apr. 7, 2023.

European Search Report for EP 21 158 176.4. Mailed Aug. 16, 2021. 21 pages.

Office Action issued for U.S. Appl. No. 17/673,489, dated Aug. 2, 2023.

Advisory Action issued for U.S. Appl. No. 17/673,489, dated Nov. 20, 2023.

Non-Final Office Action in connection to U.S. Appl. No. 17/670,852, dated Sep. 17, 2024.

* cited by examiner

INTEGRATED FLAP CONTROL UNIT

The present invention relates to an integrated controller unit for controlling at least one engine motor and at least one servo motor.

Assemblies comprising both an engine motor and a servo motor may be used in many fields, however, one particular use case for an integrated controller unit according to the present invention lies in the field of propulsion of vehicles, in particular flying vehicles with electrical propulsion, in which the engine motor is adapted to create thrust for the propulsion of the vehicle, while the servo motor is adapted to adjust the position of the engine motor and thus the direction of thrust created by the engine motor with respect to an external component, such as the body of the vehicle. Thereby, the flying vehicle may be provided with short/vertical take-off as well as hovering capabilities. It is obvious, however, that in such vehicles for safety reasons, a high level of redundancy as well as dissimilarity, fail safe design, etc. have to be established in order to prevent catastrophic accidents in case of failures of certain components of the propulsion system. However, in a more general sense of the present disclosure, a drive motor may be understood as a device which is capable to permanently deliver mechanical power to an external component such as a fan, while a servo motor may be understood as a device which is adapted to control a defined angular or spatial position between two external components and may for example be embodied by a step motor.

While the main approach with respect to redundancy in flying vehicles traditionally has been to provide multiple independent instances of critical control components such as controller units, in future vehicles such as small or medium-sized electrical propulsion aircrafts, another approach may be taken, namely to provide a plurality of assemblies comprising one or more engine motors as well as a dedicated controller unit such that the redundancy is no longer provided at controller component level but rather at the level of said assemblies comprising both at least one engine motor and a dedicated controller unit.

For said new approach, new types of controller units will have to be provided in which new design paradigms can be employed. While it was previously thought that some level of separation between critical sub-components of controller units should be provided in order to have them operate as independently from one another as possible to reduce the risk of a cascade of errors which might lead to the operability or at least redundancy of said components to be compromised, according to the above-cited new approach with the whole assembly being redundant, the integrated controller unit may be integrated to a much higher degree, since internal error propagation therein might still be contained within the redundant assembly level. By employing such highly integrated controller units, a much more compact, lightweight and cost-efficient design of the controller units can be used without compromising the overall security level of the superordinate vehicle in that even in case of failure of one or more of the basically independent assemblies the vehicle will remain fully operational.

Therefore, the present invention proposes an integrated controller unit for controlling at least one engine motor and at least one servo motor, comprising a power link section for connecting the controller unit to an external power supply and supplying power to the individual sections of the controller unit, a data link section for connecting the controller unit to an external data source, a computing section operatively connected with the power link section and the data link section for receiving data from the external data source, performing computing tasks based on the received data and outputting control commands, an engine interface section for driving the at least one engine motor, and a servo interface section for driving the at least one servo motor, wherein the engine interface section and the servo interface section are both operatively connected to the computing section and adapted to drive the at least one engine motor and the at least one servo motor, respectively, based on control commands output by the computing section.

Thus, by integrating the computing section of a controller unit with both an engine interface section and a servo interface section and relying on a common power link section as well as a common data link section, a highly integrated controller unit with a monolithic design is achieved, which can serve as a single replaceable control component at the interface of a superordinate structure from which power and input data are supplied to the engine motor as well as the servo motor. By abstaining from providing redundancy concerning for example the computing and power link sections at the controller unit level, a reduced number of overall components is required, which leads to a cost-efficient as well as light-weight and easy to assemble layout of the integrated controller unit according to the present invention, wherein a plurality of identical controller units may be employed in a single superordinate device, such as for example a flying vehicle. In an alternative variation, the present invention allows for a redundant and/or dissimilar architecture in the computing section which can lead to common mode failure tolerance. In such embodiments, dual processing by two entities independently processing the same data may be foreseen to improve safety of the unit by adding common mode failure tolerance in the complex electronic devices and data processing integrity to the integrated unit architecture.

Therein, the computing section itself may in turn comprise one or more microcontrollers, microchips and/or storage elements for storing firmware and software as well as data necessary for performing its computing tasks. Also, the data link section may be integrated with the computing section, for example by using a microcontroller or microchip layout with the required communication interfaces and capabilities or a physically separate data link section may be employed which is connected to the computing section via a suitable communication link.

While both the computing section and additional sections of the integrated controller unit according to the present invention may be provided on a single board, in other embodiments of the present invention, multiple interconnected boards and/or discrete elements may be used, which can be arranged according to space and geometry constraints present at the installation point of the unit.

Furthermore, the individual sections may be provided on a single or multiple boards or as discrete elements arranged according to for example their expected noise levels, such that high-voltage and high-power sections may be positioned as remote as possible from low-voltage and low-power sections which may be most susceptible to electromagnetic interference or similar effects.

While different variations of the data link section are conceivable to be used in the integrated controller unit according to the present invention, including wireless protocols, one possible embodiment may make use of a CAN bus interface, which is typically used in similar applications such as in vehicles for controlling periphery devices and communicating with a central or superordinate control unit.

In addition to the above-mentioned at least one engine motor and at least one servo motor, the integrated controller unit according to the present invention may further be adapted to interface with at least one accessory component and may therefore comprise at least one accessory interface section for driving said accessory component, in particular a de-icing system, wherein the accessory interface section is operatively connected to the computing section and adapted to drive the accessory component based on control commands output by the computing section. The cited example of a de-icing system may be provided to ensure that the two components between which the servo motor is acting are not blocked by ice or that no ice layer is formed at critical positions such as wing or air inlet edges of an aircraft.

While such a de-icing system is a relatively easy to control example of an accessory component in that its operation mostly relies on providing an electric current, which through resistive heating in dedicated wires will lead to the desired de-icing effect, more sophisticated or complex accessory components may also alternatively or additionally be driven by means of the at least one accessory interface section in the integrated controller unit of the present invention.

Furthermore, in order to be able to achieve feedback loops and more generally speaking improved control schemes for the motors as well as possibly the at least one accessory component, the computing section may further be adapted to receive sensor data from at least one external sensor unit which may both be associated with one of the further sections of the controller unit or be provided independently thereof. Based on said sensor data, the computing section may be adapted to suitably adopt control strategies of the motors as well as accessory components, for example by using the sensor data as input for suitable algorithms which will subsequently influence the corresponding output control commands issued by the computing section.

In certain embodiments of the present invention, the power link section may be adapted to be supplied with high-voltage direct current, for example at about 500 to 900 V, and may preferably comprise a DC-DC converter with an output voltage of about 20 V to 48 V. Thus, the high voltage required to drive high-performance engine motors may be readily available to the integrated controller unit, while by converting down the high voltage, also low-voltage components such as microprocessors of the computing section may be supplied. However, the power link section may further be adapted to be additionally supplied with low-voltage direct current, for example at about 24 to 48 V, in order to directly supply low-voltage electronic components thereof without the need of operating an DC-DC converter, for example for testing purposes. Furthermore, the power link section may comprise a DC link block for providing an energy buffer link from direct current to alternative current. Such DC link blocks alternatively or additionally might also be provided to one or more of the engine interface section, the servo interface section and the accessory interface section.

While both the engine interface section and the servo interface section may be designed in any suitable manner while being able to perform their tasks and in particular may comprise all sorts of electronic and electrical components, in some embodiments, the engine interface section and/or the servo interface section may in particular comprise at least one gate driver and at least one semiconductor switch, such as a power MOSFET, a IBGT or a BJT, and preferably furthermore at least one sensor unit, in particular for monitoring a voltage and/or a current. By providing said at least one sensor unit, the operation and performance of the respective motor may be monitored by the computing section in real time, which may in turn be used to adapt the control strategy thereof in a suitable manner. Further parameters which may be monitored by sensor units integrated in the engine interface section as well as the servo interface section may comprise temperatures, rpm, angular positions of certain components, vibrations, etc.

In order to decouple the integrated controller unit from external electronic interferences and similar noise effects, it may furthermore comprise at least one EMI filter, preferably as a part of the power link section, the engine interface section and/or the servo interface section. Additionally or alternatively, the integrated controller unit according to the present invention may also comprise at least one DC link block provided to the power link section, the engine interface section, the servo interface section and/or the accessory interface section, for providing an energy buffer link.

Furthermore, the computing section of the integrated controller unit according to the present invention may be adapted to communicate feedback and/or status information by means of the data link section to at least one external unit. Thus, information may be forwarded by the computing section of the integrated controller unit to for example a superordinate control unit, which information may for example comprise data on the performance and operation of the at least one engine motor and/or servo motor, information about the operational status of the computing section and additional sensor data recorded in the proximity of the integrated controller unit. For the purpose of communicating such information, the same channel as for connecting the controller unit to the external data source may be used, such as the CAN bus mentioned above, or an individual dedicated channel may be used therefor, possibly employing a different communication protocol.

According to a second aspect, the present invention relates to an assembly, comprising an integrated controller unit according to the invention, at least one engine motor and at least one servo motor, which are adapted to be driven by the engine interface section and the servo interface section of the integrated controller unit, respectively. Said assembly may furthermore comprise additional components, such as at least one accessory component, in particular a de-icing system, which is adapted to be driven by the accessory interface section of the integrated controller unit, at least one sensor unit for providing sensor data to the computing section of the integrated controller unit, an active cooler unit or also passive components such as heat sinks.

While the at least one sensor unit may be employed as a standalone unit or may be integrated with any of the sections of the controller unit, it may also be part of the at least one engine motor, the at least one servo motor and/or the at least one accessory component and may thus be adapted to monitor at least one operating parameter thereof and provide respective sensor data to the integrated controller unit. Typical types of sensor data thus collected by suitable sensor units include but are not restricted to position data, temperature data, vibration data and electrical data, such as currents and voltages.

In one particular embodiment, the assembly according to the present invention may be designed such that the at least one engine motor is part of an electrically-driven ducted fan, and the integrated controller unit is preferably at least partially installed in a back cone area thereof. In such ducted fans, an engine motor for creating thrust by means of a rotatable fan is arranged inside a cylindrical duct, while a stator with stationary vanes is provided in flow direction of the air moving inside the duct behind the fan. Radially inside and/or axially behind said stator, a back cone can be provided for guiding the air flow through the duct and out of it while providing space for accommodating electrical and/or electronic components. With the air flowing along the back cone at high local speeds, cooling is intrinsically provided to components located inside said back cone, such that components with high thermal activity, such as the engine interface section of the integrated controller unit of the present invention, may be positioned along the internal perimeter of the back cone for providing maximum cooling power thereto.

In certain other embodiments of specific aircraft configurations, a more extensive incorporation of the controller unit into the aircraft fuselage may be applied. This architectural option implements a higher level of integration with the aerodynamic structure of the wings and flaps, to embed the electronic parts and optimize harness routing. This assembly can be arranged according to space and geometry constraints present at the installation point of the wings and flap structure, implementing a distributed configuration of the unit and positioning respectively the engine drive section and the servo drive section near by the engine motor and the servo actuator respectively. With a similar concept, the correspondent engine motor controller and servo controller functions of the controller unit can be implemented with at least two separate board assemblies and allocated accordingly, near by the engine motor and the servo actuator.

In particular, in such an assembly at least one of the power link section, the data link section, the computing section, the engine interface section and the servo interface section may positioned in a first installation area and/or on a first circuit board and at least one of said components may be positioned in a second installation area and/or on the second circuit board, wherein the first and second installation areas and/or first and second circuit boards are spatially distributed and interconnected by dedicated data and power links.

In a particularly beneficial embodiment, the engine interface may be allocated in proximity of the engine motor, while the servo interface comprising at least one DC-DC converter may be allocated in proximity of the servo actuator. With a similar concept, the correspondent engine motor controller and servo controller functions of the controller unit can be implemented with two separate board assemblies and allocated accordingly, near by the engine motor and the servo actuator. Technical effects of such a distributed controller unit, driven by an increased integration in the aerodynamic aircraft structure in accordance with the space and geometry constraints present at the installation point of the unit, are harness optimization and weight reduction, electromagnetic/EMI noise reduction by limiting susceptibility to electromagnetic interference or similar effects, as well as an improved thermal/cooling performance.

The assembly according to the invention may in particular be used in an aircraft, comprising at least one pair of wings, a fuselage, a central computing unit and a central power supply, wherein the at least one engine motor is mounted to the aircraft in such a manner as to be tiltable relative to the fuselage and/or the at least one pair of wings, and wherein the at least one servo motor is arranged to cause said tilting of the at least one engine motor. Such aircrafts may for example be intended for vertical/short take-off and landing in that the thrust vectors of their engines may be directed in different directions from vertical for take-off and hovering to horizontal for cruise flight conditions. In such embodiments, the at least one servo motor will serve to adjust the relative position between the at least one engine motor and the aircraft body, such that the direction of the thrust vector of the at least one engine motor can be controlled by accordingly driving the at least one servo motor, wherein the absolute value of the thrust can be adjusted by controlling the power output of the at least one engine motor.

By providing a suitably high number of such assemblies to a single aircraft, each comprising at least one servo motor, at least one engine motor and an integrated controller unit, redundancy may be achieved on the level of said assemblies, such that an error or a problem in one of said assemblies can be balanced by accordingly driving the remaining assemblies for example with a higher power output and thus a higher thrust. By providing differential thrust between the individual engine motors of the aircraft, a high level of redundancy can be achieved between the individual assemblies in the aircraft as long as the overall thrust output of the operating engine motors allows for compensating the non-operational ones.

In one possible embodiment, the aircraft may comprise a plurality of flap elements, which are each provided to the wings of the aircraft in a manner tiltable relative thereto by means of a servo motor, wherein each of the flap elements is further provided with at least one engine motor, wherein the servo motor and the at least one engine motor of the same flap are driven by the same integrated controller unit, thus forming an assembly according to the invention as outlined above. In particular, one or more engine motors may be provided to a single flap, for example in the configuration of the above-described ducted fans and to each flap element, a single integrated controller unit may be assigned and preferably mounted thereon, for example in the back cone area of one of the ducted fans.

Figure 2:
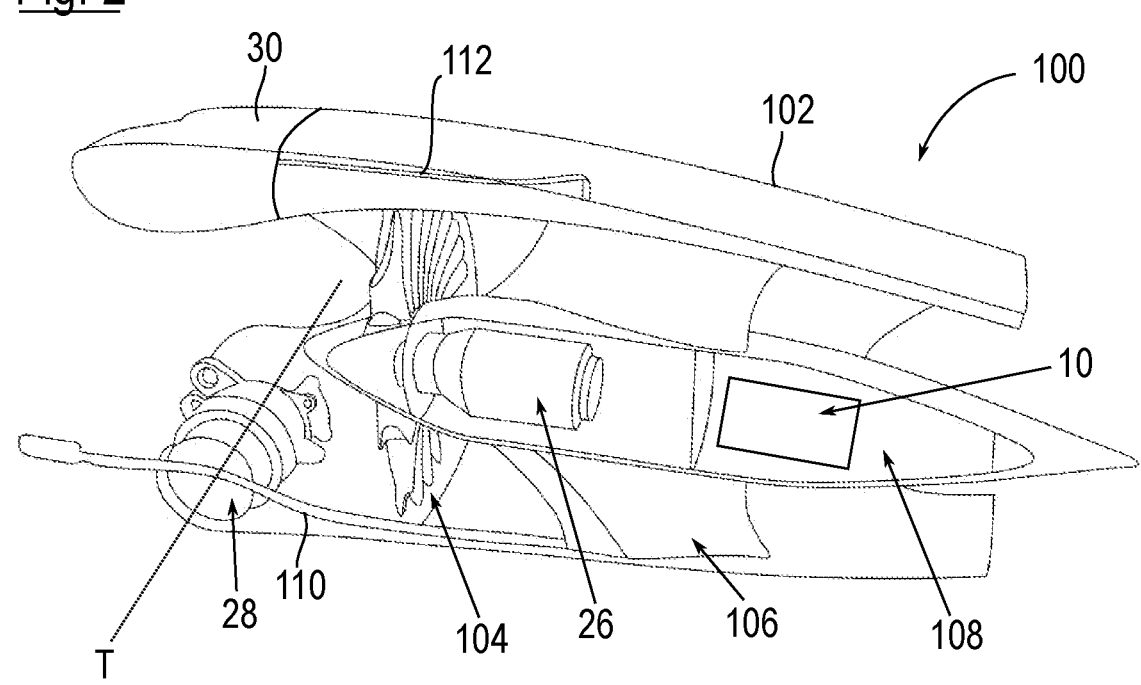
Figure 3:
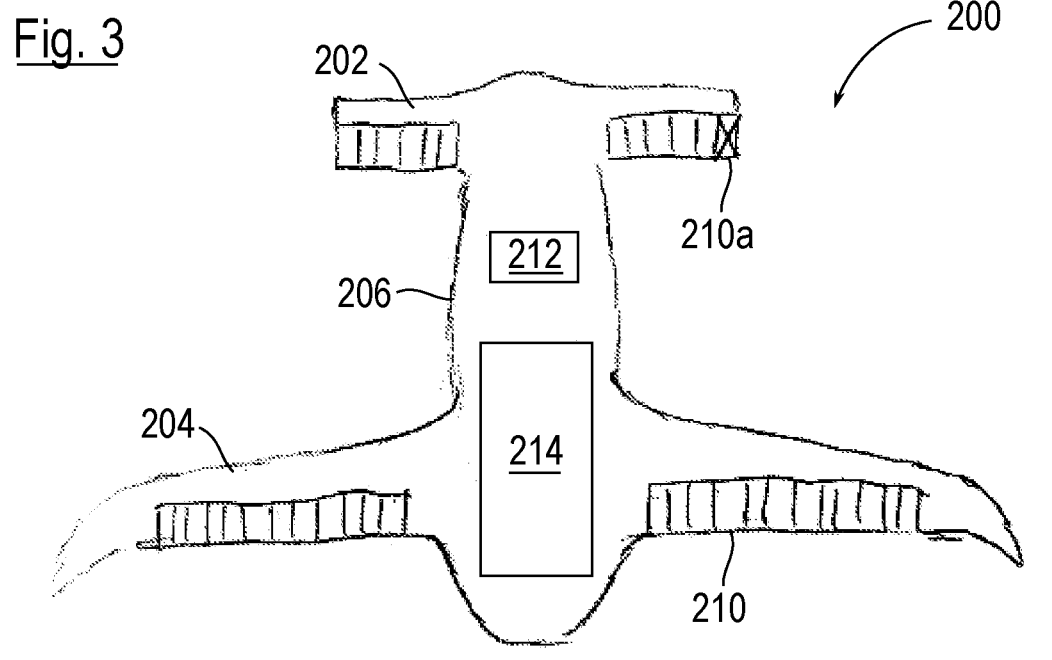

Further features and advantages of the present invention will become even clearer from the following description of embodiments thereof when taken together with the accompanying drawings, which show in particular:

FIG. 1 a schematic view of an integrated controller unit according to the present invention;

FIG. 2 a schematic view of a ducted fan in which an assembly according to the present invention is employed; and FIG. 3 a schematic view of an aircraft in which a number of ducted fan engines are mounted on flaps.

In FIG. 1, an integrated controller unit according to the present invention is shown in a schematic manner and generally denoted with the reference numeral 10.

Said controller unit 10 comprises a power link section 12 for connecting the controller unit to an external power supply 14 and for supplying power to the individual sections of the controller unit 10 discussed below. For said purpose, the power link section 12 comprises two inputs 12a1 and 12a2 as well as four outputs 12b1 to 12b4, respectively.

Internally, the power link section 12 further comprises an EMI filter unit 12c for reducing noise and interferences as well as a DC-DC converter 12d for converting the input high-voltage direct current to an output low-voltage direct current, wherein the conversion may for example result in a reduction of the voltage from 800 V to 28 V.

As can be seen in FIG. 1, the reduced voltage of 28 V is only applied to one of the output sockets 12b4, whereas the remaining output sockets 12b1 to 12b3 receive the full input voltage of 800 V. As will be described below, the reduced voltage of 28 V is supplied to low-voltage electronic components, while the high voltage is supplied to high-voltage power components. Additionally, the second input socket 12a2 can be used to directly provide low voltage for the output socket 12d4 and can thus for example be used for testing purposes or as a secondary power input for the low-voltage electronic components. Furthermore, the power link section 12 may comprise a DC link block for providing an energy buffer link from direct current to alternative current.

Similarly to the power link section 12, which serves to connect the controller unit 10 to an external power source 14, a data link section 16 is provided, which serves as an interface to an external data source. For this purpose, the data link section 16 may comprise a CAN bus interface or an interface for any other suitable communication standard, wherein due to safety concerns wired communication may be preferable over wireless communication. It shall further be noticed that the data link section may be adapted for unidirectional or bidirectional communication, such that the integrated controller unit 10 may in some embodiments also provide data, such as operational or performance data, to at least superordinate entity, which may be identical with or separate from the data source. Furthermore, the data link 16 section may be provided in a redundant and dissimilar manner or may comprise redundant and dissimilar components serving same purposes.

Connected to both the low voltage output 12b4 of the power link section 12 and the data link section 16 is a computing section 18, which may for example comprise one or more microprocessors or microcontrollers 18a and a storage unit 18b on which data and program code may be stored for performing computing tasks in the context of the operation of the integrated controller unit 10. In particular, the computing section (18) may comprise a redundant and/or dissimilar architecture capable of dual independent processing of the same data.

The computing section 18 is in turn operatively connected to an engine interface section 20, a servo interface section 22 and an accessory interface section 24, which are supplied with high-voltage direct current by means of the high voltage outputs 12b1 to 12b3 of the power link section 12. Each of the engine interface section 20, the servo interface section 22 and the accessory interface section 24 may be provided with gate drivers 20a, 22a, 24a that are controlled by control commands output by the computing section 18 as well as semiconductor switches 20b, 22b, 24b, such as power MOSFETS, through which power is output to the engine motor 26, the servo motor 28 and the accessory component 30, respectively, wherein the accessory component may for example be embodied by a de-icing system. It shall be noted that in some variations of the present embodiment, at least one of the an engine interface section 20, the servo interface section 22 and the accessory interface section 24 may be comprised of a non-fault-tolerant (e.g. three phase) or multi-phase/fault tolerant architecture, in which the respective component can still be operational, albeit with lower performance, if a single phase or small set of phases should fail.

In addition to the respective gate drivers 20a, 22a and 24a as well as the semiconductor switches 20b, 22b and 24b, each of the interface sections 20, 22 and 24 may also comprise at least one sensor unit 20c, 22c and 24c, which may for example be adapted to measure currents or voltages or also other operating parameters such as a position of the servo motor, the rpm of the engine motor, a temperature, vibrations or similar quantities.

During operation of the integrated controller unit 10, it receives high voltage as well as data for its operation via the power link section 12 and the data link section 16 and based on said data as well as the sensor data provided by the sensor units 20c, 22c, 24c as well as possibly additionally external sensors control commands are output for the engine interface section 20, the servo interface section 22 and the accessory interface section 24 based on which the engine motor 26, the servo motor 28 and the accessory component 30 are driven and operated.

By means of providing the monolithic integrated controller unit 10 of the present invention, an assembly comprising said integrated controller unit 10 as well as the engine motor 26, the servo motor 28 and the accessory component 30 can for example be embodied by or integrated in the electrically driven ducted fan 100 shown in FIG. 2.

In an alternative embodiment, based on space and geometry constraints present at the installation point of the wings and flap structure, such an integrated controller unit could also be distributed into two main parts, allocating part of the multiple interconnected boards and/or discrete elements of the integrated controller unit also into a second installation area. The two unit parts are then connected by a dedicated communication and power link.

Therein, within a cylindrical duct 102, a rotatable fan 104 is provided and driven by the engine motor 26. Said motor 26 is integrated in a volume radially inside of a stator 106 with stationary vanes, while the integrated controller unit 10 is integrated at least partially in the back cone area 108, which also furthermore serves as a guiding means for air flowing through the cylindrical duct 102.

Both power and CAN bus cables are provided in a cable harness 110, which extends along a section of the cylindrical duct 102 and through one of the vanes of the stator 106 and into the back cone area 108, where connection to the integrated controller unit 10 is made. In alternative embodiments, the required cables may also be provided in a plurality of cable harnesses and/or be routed through multiple vanes for providing physical segregation. Also, additional measures for ensuring safe operation thereof may be provided, such as physical barriers between the individual cables.

Furthermore, an additional cable 112 is shown, by means of which a de-icing system serving as accessory component 30 is supplied with electrical power in order to prevent the formation of an ice layer on the edges of the air inlet of the ducted fan 100.

The ducted fan 100 itself may be positioned at a portion of a wing or the fuselage of a superordinate aircraft (not shown in FIG. 2) and connected thereto via the servo motor 28, which allows to tilt the cylindrical duct 102 with all components provided thereto and therein with respect to a tilt axis T. Thus, by means of operating the servo motor 28, the angle between the cylindrical duct 102 and thus the thrust vector provided during operation of the engine motor 26 can be adjusted with respect to the wing or the fuselage of the aircraft, such that the ducted fan engine 100 can for example be displaced between a hovering position in which its thrust vector points in a vertical direction and a cruise position in which its thrust vector points substantially horizontally.

Finally, in FIG. 3, a schematic top view of an aircraft 200 with two pairs of wings 202 and 204 as well as a fuselage 206 is shown, in which at the trailing edges of each of the wings 202 and 204 a number of flaps 210 are provided. Said flaps 210 functionally correspond to the assembly 100 shown in FIG. 2, such that they comprise a base part, which is tiltable with respect to the respective wing 202 or 204 by means of a servo motor, whereas it further carries at least one propulsion engine in form of a ducted fan electrically driven by a drive motor. Typically, three such ducted fans may be provided on each flap, however, embodiments with a higher or smaller number of ducted fans per flap are equally conceivable, while the number of ducted fans may also vary among the flaps 210. Each of said flaps 210 is furthermore provided with an integrated controller unit as shown in FIG. 1, wherein the respective controller units are adapted to drive the servo motor associated with the respective flap 210 as well as the one or more drive motors positioned on the respective flap 210.

Each of the integrated controller units of the respective flaps 210 are in data connection with a central control unit 212 providing them with control data via a CAN bus system as well as a central power source 214 of the aircraft 200, such as a battery pack, for storing and providing electrical power as discussed in the context of FIG. 1 above.

By providing a large number of individual flaps, each of which may contribute to the propulsion of the aircraft 200 in a differential manner, the loss of one or more of the flaps 210, for example due to electrical or mechanical failure, can be compensated by the remaining flaps 210 thus providing redundancy on flap level.

For example if the flap 210a, which is crossed out in FIG. 3, does not work as expected, the central control unit 214 can adjust the operation of the remaining flaps 210 concerning their angle to the respective wing 202, 204 by means of its servo motor as well as concerning the thrust provided by the respective one or more fans as controlled via the respective engine motor in order to compensate for the non-operational flap 210a. For this purpose, each of the flaps 210 by means of their integrated controller unit provides the central control unit 212 with operation and sensor data, such that the central control unit 212 is able to identify the current status of each of the flaps 210 in such a manner that correct operation of the aircraft 200 is guaranteed even if one or more of the flaps 210 are currently non-operational.

The invention claimed is:

1. An integrated controller unit for controlling at least one engine motor and at least one servo motor, comprising:
   a power link section for connecting the controller unit to an external power supply and supplying low-voltage and/or high-voltage electrical power to individual sections of the controller unit, wherein the external power supply comprises high-voltage direct current power at about 500-900 V, and the power link section further comprises a DC-DC converter that receives the high-voltage direct current power and converts it to the low-voltage electrical voltage with an output voltage of about 24-48 V;
   a data link section for connecting the controller unit to an external data source, wherein the data link section is provided the low-voltage electrical power from the power link section;
   a computing section operatively connected with the power link section and the data link section for receiving data from the external data source, performing computing tasks based on the received data and outputting control commands, wherein the computing section is provided the low-voltage electrical power from the power link section;
   an engine interface section for driving the at least one engine motor, wherein the engine motor comprises an electric engine motor for an electrically driven ducted fan and the engine interface section is provided the high-voltage electrical power from the power link section, and wherein the engine interface section directly provides high-voltage electrical power to the electric engine motor; and
   a servo interface section for driving the at least one servo motor, wherein the servo interface section is provided the high-voltage electrical power from the power link section, and wherein the servo interface section provides high-voltage electrical power to the at least one servo motor;
   wherein the engine interface section and the servo interface section are both operatively connected to the computing section and adapted to drive the at least one engine motor and the at least one servo motor, respectively, based on control commands output by the computing section.

2. The integrated controller unit according to claim 1, further comprising:
   at least one accessory interface section for driving an accessory component, in particular a de-icing system, wherein the accessory interface section is operatively connected to the computing section and adapted to drive the accessory component based on control commands output by the computing section.

3. The integrated controller unit according to claim 1, wherein the computing section is further adapted to receive sensor data from at least one external sensor unit.

4. The integrated controller unit according to claim 1, wherein the computing section comprises a redundant and/or dissimilar architecture capable of dual independent processing of the received data.

5. The integrated controller unit according to claim 1, wherein the engine interface section and/or the servo interface section comprise at least one gate driver and at least one semiconductor switch, such as a power MOSFET, and at least one sensor unit for monitoring a voltage and/or a current.

6. The integrated controller unit according to claim 1, comprising at least one EMI filter as a part of the power link section, the engine interface section and/or the servo interface section and/or comprising at least one DC link block provided to the power link section, the engine interface section, the servo interface section and/or the accessory interface section.

7. The integrated controller unit according to claim 1, wherein the computing section is further adapted to communicate feedback and/or status information by means of the data link section.

8. An assembly, comprising an integrated controller unit, at least one engine motor and at least one servo motor, wherein the integrated controller unit comprises:
   a power link section for connecting the controller unit to an external power supply and supplying low-voltage and/or high-voltage electrical power to the individual sections of the controller unit, wherein the external power supply comprises high-voltage direct current power at about 500-900 V, and the power link section further comprises a DC-DC converter that receives the high-voltage direct current power and converts it to the low-voltage electrical voltage with an output voltage of about 24-48 V;
   a data link section for connecting the controller unit to an external data source, wherein the data link section is provided the low-voltage electrical power from the power link section;
   a computing section operatively connected with the power link section and the data link section for receiving data from the external data source, performing computing tasks based on the received data and outputting control commands, wherein the computing section is provided the low-voltage electrical power from the power link section;

an engine interface section for driving the at least one engine motor, wherein the at least one engine motor comprises an electric engine motor for an electrically driven ducted fan and the engine interface section engine interface section is provided the high-voltage electrical power from the power link section, and wherein the engine interface section directly provides high-voltage electrical power to the electric engine motor; and a servo interface section for driving the at least one servo motor, wherein the servo interface section is provided the high-voltage electrical power from the power link section, and wherein the servo interface section provides high-voltage electrical power to the at least one servo motor;

wherein the engine interface section and the servo interface section are both operatively connected to the computing section and adapted to drive the at least one engine motor and the at least one servo motor, respectively, based on control commands output by the computing section; and wherein the at least one engine motor and the at least one servo motor are adapted to be driven by the engine interface section and the servo interface section of the integrated controller unit, respectively.

9. The assembly according to claim 8, further comprising at least one accessory component, in particular a de-icing system, which is adapted to be driven by the accessory interface section of the integrated controller unit.

10. The assembly according to claim 8, wherein the at least one engine motor, the at least one servo motor and/or the at least one accessory component comprises a sensor unit which is adapted to monitor at least one operating parameter thereof and provide respective sensor data to the integrated controller unit.

11. The assembly according to claim 8, wherein the integrated controller unit is at least partially installed in a back cone area of the electrically driven ducted fan.

12. The assembly according to claim 8, wherein at least one of the power link section, the data link section, the computing section, the engine interface section and the servo interface section is positioned in a first installation area and/or on a first circuit board and at least one of said components is positioned in a second installation area and/or on the second circuit board, wherein the first and second installation areas and/or first and second circuit boards are spatially distributed and interconnected by dedicated data and power links.

13. An aircraft comprising at least one pair of wings, a fuselage, at least one assembly according to claim 8, a central computing unit and a central power supply, wherein the at least one engine motor is mounted to the aircraft in such a manner as to be tiltable relative to the fuselage and/or the at least one pair of wings, wherein the at least one servo motor is arranged to cause said tilting of the at least one engine motor.

14. The aircraft according to claim 13, wherein a plurality of flap elements are provided to the wings in a manner tiltable relative thereto by means of a servo motor, wherein each of the flap elements is further provided with at least one engine motor, wherein the servo motor and the at least one engine motors of the same flap are driven by the same integrated controller unit.

15. The aircraft according to claim 14, wherein to each flap element a single integrated controller unit is assigned and mounted thereon.

\* \* \* \* \*